US011847022B2

(12) United States Patent
Abali et al.

(10) Patent No.: US 11,847,022 B2
(45) Date of Patent: Dec. 19, 2023

(54) COMPUTATION AND PLACEMENT OF ERROR CORRECTING CODES (ECC) IN A COMPUTING SYSTEM DATA CACHE

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US); Brian Robert Prasky, Campbell Hall, NY (US); Deanna Postles Dunn Berger, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/653,825

(22) Filed: Mar. 7, 2022

(65) Prior Publication Data
US 2023/0281077 A1 Sep. 7, 2023

(51) Int. Cl.
*G06F 11/10* (2006.01)
*G06F 9/30* (2018.01)

(52) U.S. Cl.
CPC ...... *G06F 11/1044* (2013.01); *G06F 9/30029* (2013.01); *G06F 11/1064* (2013.01)

(58) Field of Classification Search
CPC ............. G06F 11/1044; G06F 9/30029; G06F 11/1064
See application file for complete search history.

(56) References Cited

U.S. PATENT DOCUMENTS

| 7,225,297 | B2 | 5/2007 | Heil |
| 9,710,324 | B2 | 7/2017 | Trombley |
| 10,423,482 | B2 | 9/2019 | Loewenstein |
| 11,036,636 | B2 | 6/2021 | Chhabra et al. |
| 2014/0101514 | A1* | 4/2014 | Cho ................. H03M 13/09 714/763 |
| 2014/0143635 | A1 | 5/2014 | Ganhi et al. |

(Continued)

FOREIGN PATENT DOCUMENTS

CN 113495862 A 10/2021

OTHER PUBLICATIONS

Alameldeen et al., "Energy-Efficient Cache Design Using Variable-Strength Error-Correcting Codes", Proceedings of the 38th annual international symposium on computer architechture, ISCA '11, Jun. 2011, pp. 461-472, https://doi.org/10.1145/2000064.2000118 (11 pages).

(Continued)

*Primary Examiner* — Thien Nguyen
(74) *Attorney, Agent, or Firm* — Griffiths & Seaton PLLC

(57) ABSTRACT

Computation, placement, and accessing of error correcting codes (ECC) in a computer system data cache enabling partial reads and writes to each line of data in the cache. For storing multiple compressed blocks, received at differing time periods, in a single cache line, the ECC for the first compressed block is stored in the ECC field of the cache and the ECC for the second and subsequently received compressed blocks is appended to the compressed data. Additionally, an auxiliary ECC cache may be constructed for temporarily holding a partial ECC for a partial read/write, and a new ECC for the partial read/write is computed using the partial ECC.

15 Claims, 10 Drawing Sheets

(56) References Cited

U.S. PATENT DOCUMENTS

| | | | |
|---|---|---|---|
| 2017/0147429 A1* | 5/2017 | Motwani | H03M 13/6318 |
| 2018/0151197 A1* | 5/2018 | Kim | H03M 13/6575 |
| 2020/0177899 A1* | 6/2020 | Jun | H04N 19/423 |
| 2021/0191812 A1 | 6/2021 | Golov | |
| 2022/0012126 A1 | 1/2022 | Galbi et al. | |

OTHER PUBLICATIONS

Texas Instruments, "Keystone Error Detection and Correction", SPRACO4A, Feb. 2020, Revised Jun. 2021, (5 pages).

Asadi et al., "Reducing Data Cache Susceptibility to Soft Errors", IEEE Transactions on dependable and secure computing, vol. 3, Issue 4, pp. 353-364, Oct. 2006, https://doi.org/10.1109/TDSC.2006.55 (25 pages).

Mohr et al., "Delay and Area Efficient First-level Cache Soft Error Detection and Correction", IEEE International conference on computer design, ICCD 2006, DOI: 10.1109/ICCD.2006.4380799 (5 pages).

Anonymous, "Dynamic Error Correction for Lifetime Limited Memories", IPCOM000214417D, Jan. 2012, (4 pages).

Anonymous, "Cache Memory with Configurable Line Size", IPCOM000157030D, Aug. 2007, (7 pages).

Anonymous, "Method for update bits to improve recoverability from uncorrectable errors for last-level cache", IPCOM000143907D, Dec. 2006 (3 pages).

* cited by examiner

COMPUTATION AND PLACEMENT OF ERROR CORRECTING CODES (ECC) IN A COMPUTING SYSTEM DATA CACHE

BACKGROUND OF THE INVENTION

FIELD OF THE INVENTION

The present invention relates in general to computing systems, and more particularly, to various embodiments for the computation and placement of error correcting codes (ECC) in a computing system data cache.

DESCRIPTION OF THE RELATED ART

A cache is a memory component of a computer system that transparently retains data elements (or simply data) so that future requests for any retained data can be served faster. To ensure the validity of data in the cache, the data can he checked for errors. ECC bits are often kept with data in caches to protect against memory failures. ECC encodes data by generating ECC data (e.g., redundancy bits or parity bits) that are stored along with the data in a memory device. For example, 8 parity bits can be generated for 32 bits of data or 64 bits of data. An ECC that generates 8 bits of parity for 32 bits of data can usually detect two-bit errors and correct one hit error in the 2 bits of data. Similarly, an ECC that generates 8 parity bits for 64 bits of data can usually detect two-bit errors and correct one hit error in the 64 bits of data. Many other error correction methods exist, for example such as storing exclusive-OR (XOR) sum of original data bits in the redundancy bits and recovering an erroneous bit via performing some algebraic operations as a function of the redundancy bits and the correct bits.

SUMMARY OF THE INVENTION

Various computer-implemented embodiments for providing multiple ECC for multiple data blocks in a cache line are provided. One embodiment includes receiving, at a first time by a cache data array comprised of fixed-length cache lines and each cache line consisting of fixed-length data elements, a first set of compressed data blocks in a cache line of the fixed-length cache lines. A first ECC is computed for the first set of compressed data blocks at the first time and stored in an ECC field within the cache data array. At a second time after the first time, a second set of compressed data blocks is received by the cache data array. A second ECC is computed for only the second set of compressed data blocks at the second time, and the second ECC is stored in at least one additional ECC field in the cache data array.

In other embodiments, a computer-implemented method for computing and storing error correcting codes (ECC) of partial reads and writes to a cache line is provided. Another embodiment includes providing, in addition to an ECC field in a cache data array, an auxiliary ECC cache. A read request to partially read data from the cache line in the cache data array is received, where an ECC of the cache line is stored in the ECC field. A partial ECC (PECC) incorporating the partially-read data from the cache line is computed, and the PECC is stored in the auxiliary ECC cache. A write request to partially write modified data to the cache line in the cache data array is received, and a new ECC for the cache line is computed using the PECC. The new ECC is then stored in the ECC field.

In addition to the foregoing exemplary embodiments, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
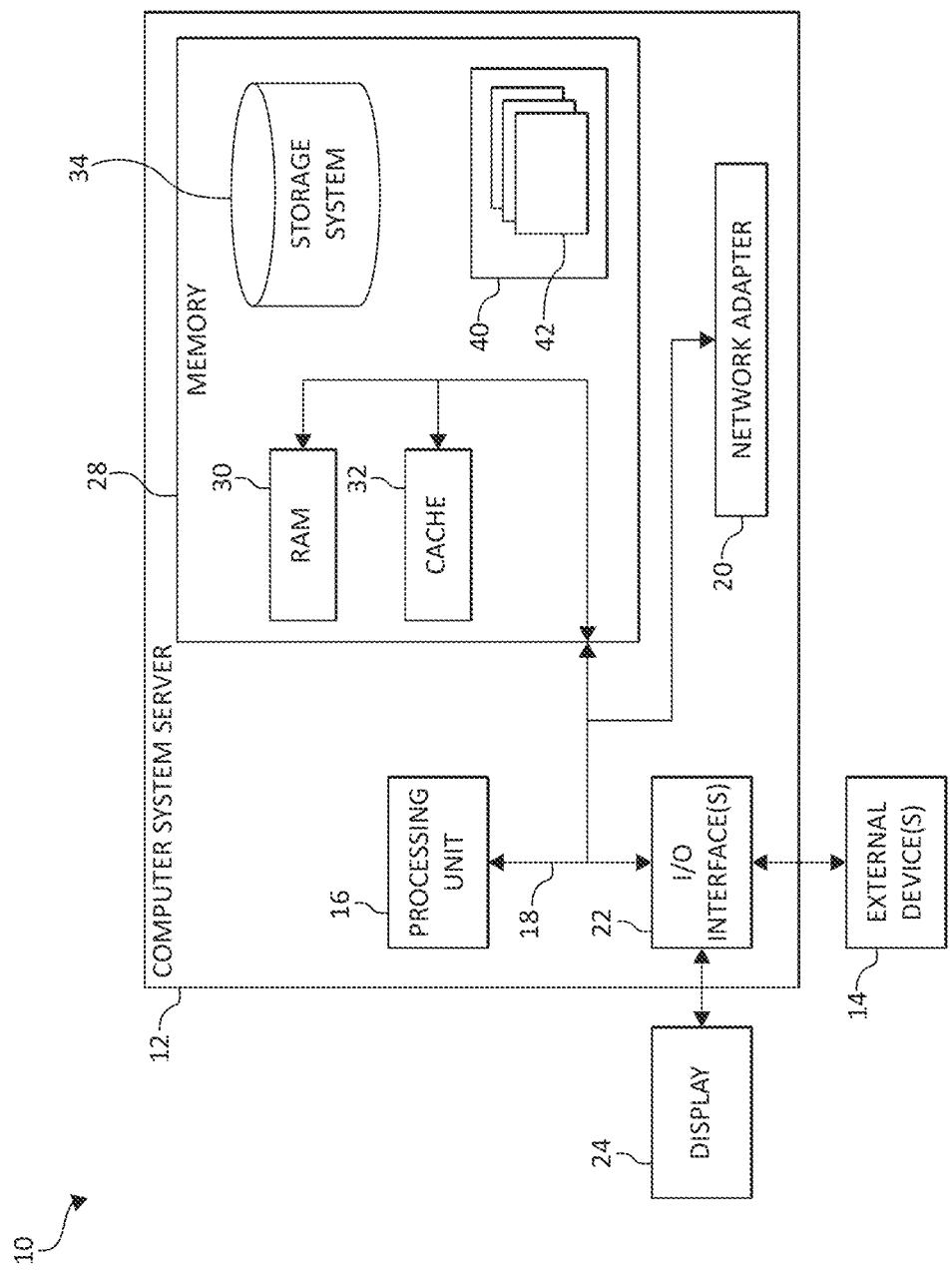
FIG. 1 is a block diagram depicting an exemplary computing node, according to an embodiment of the present invention.

As discussed above, a cache is a memory component of a computer system that transparently retains data elements (or simply data) so that future requests for any retained data can be served faster. A data element that is stored within a cache corresponds to a pre-defined. storage location within a computer memory system. Such data element might have a value that has recently, been computed or be a duplicate copy of a data value that is stored in the pre-defined storage location. If requested data is contained in the cache, this is referred to as a. cache hit and the request can be served by simply reading the cache. if the requested data is not contained in the cache, this is referred to as a cache miss and the data must be fetched from system memory (or other storage medium) which is not necessarily close to the requester, and thus is comparatively slower when compared to accessing data in a cache. In general, the greater the number of requests that can be served from the cache, the faster the overall system performance becomes. Generally, the cache comprises a set of fixed-length cache lines (e.g., 256-bytes), where each cache line consists of fixed-length data elements, or more simply, data.

To ensure the validity of data in the cache, the data can be checked for errors. FCC bits are often kept with data in caches to protect against both soft and hard failures. ECC encodes data by generating ECC data (e.g., redundancy bits or parity bits) that are stored along with the data in a memory device (i.e., for each cache line). With respect to the present invention, the ECC data is, in one embodiment, a 16-byte codeword ECC word) computed by the exclusive-OR (XOR) function of the sixteen 16-byte quadwords constituting the 256-byte cache line, therefore maintaining each cache line at 272-bytes. In other embodiments, ECC functions other than XOR and ECC word sires other than 16-byte may additionally he used with respect to the mechanisms of the disclosure without limitation, Although ECC of cache lines protects the data therein, there are inherent limitations to the computation, accessing, and storage of the ECC. For example, when two or more compressed lines are written to a single 272-byte cache line at different points in time, an ECC must be independently computed for each of the two or more compressed lines. However, in traditional caches known today, only a single ECC field is provided in the 272-byte cache line. Thus, as performed currently, a single ECC protecting a plurality of compressed lines may be generated, however this method requires reading the existing-stored lines first, recalculating the ECC for the entirety of the cache line (i.e., the two or more compressed data lines), and writing back the single ECC that protects the entire cache line to the single ECC field of the cache line. This read-modify-write operation is undesirable because this uses an excessive number of read/write operations and consumes excess bandwidth.

In another example, in some operational scenarios, a data line in the computer system data may be partially written to the cache. For example, instead of a full 256-byte write to a cache line, a 64-byte line may be written to the cache, therefore only partially updating the 256-byte cache line. One of the inherent issues with performing such a partial write is that the ECC is an XOR sum of all the constituents of the full 256-byte cache line. As such, a partial write will render the data line's ECC invalid since it is not known the remaining 192-byte's values at the time of the 64-byte partial write. The obvious solution to such a case is to first read the entire 256-byte line, update the 64-byte portion, calculate a new ECC for the entire 256-byte line, and finally write the full 256-byte line into the cache. However, this prior-art solution suffers from the same read-modify-write issues as discussed above. Namely, requiring data of the entire cache line to be read, computing a new ECC for the line, and writing the entire line back into the cache requires excessive bandwidth because the partial write (e.g., 64-byte write) effectively turns into a full 256-byte write when only a portion of the data was needed/requested by the requestor.

Accordingly, the mechanisms of the present invention provide novel and innovative processes to reduce the aforementioned drawbacks associated with ECC functionality of the read-modify-write operations currently required both to store multiple compressed lines, written at differing times, to the cache and perform partial reads/writes to the cache. One embodiment includes receiving, at a first time by a cache data array comprised of fixed-length cache lines and each cache line consisting of fixed-length data elements, a first set of compressed data blocks in a cache line of the fixed-length cache lines. A first ECC is computed for the first set of compressed data blocks at the first time and stored in an ECC field within the cache data array. At a second time after the first time, a second set of compressed data blocks is received by the cache data array. A second ECC is computed for only the second set of compressed data blocks at the second time, and the second ECC is stored in at least one additional ECC field in the cache data array.

Another embodiment includes providing, in addition to an ECC field in a cache data array, an auxiliary ECC cache. A read request to partially read data from the cache line in the cache data array is received, where an ECC of the cache line is stored in the ECC field. A partial ECC (PECC) incorporating the partially read data from the cache line is computed, and the PECC is stored in the auxiliary ECC cache. A write request to partially write modified data to the cache line in the cache data array is received, and a new ECC for the cache line is computed using the PECC. The new ECC is then stored in the ECC field.

It should be noted that the following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two (i.e., two, three, four, five, etc.). The term "connection" may include both an indirect "connection" and a direct "connection."

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

It should further be noted that data is increasingly processed through a variety of geographically disbursed computing components, where, for example, a local node may contain a set of data processing components yet remain in remote communication with other portions of the distributed data processing system. Within the context of the present disclosure, a distributed cache, for example, may include data which is not stored on a local host computer, but is instead hosted and/or processed (e.g., via distributed compilation) by one or more distributed storage components that are in remote communication with the local computer. This type of data storage may, in some cases, be referred to as "cloud," or "cloud-based" storage.

Accordingly, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as local computing environments and cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32 ("cache"). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
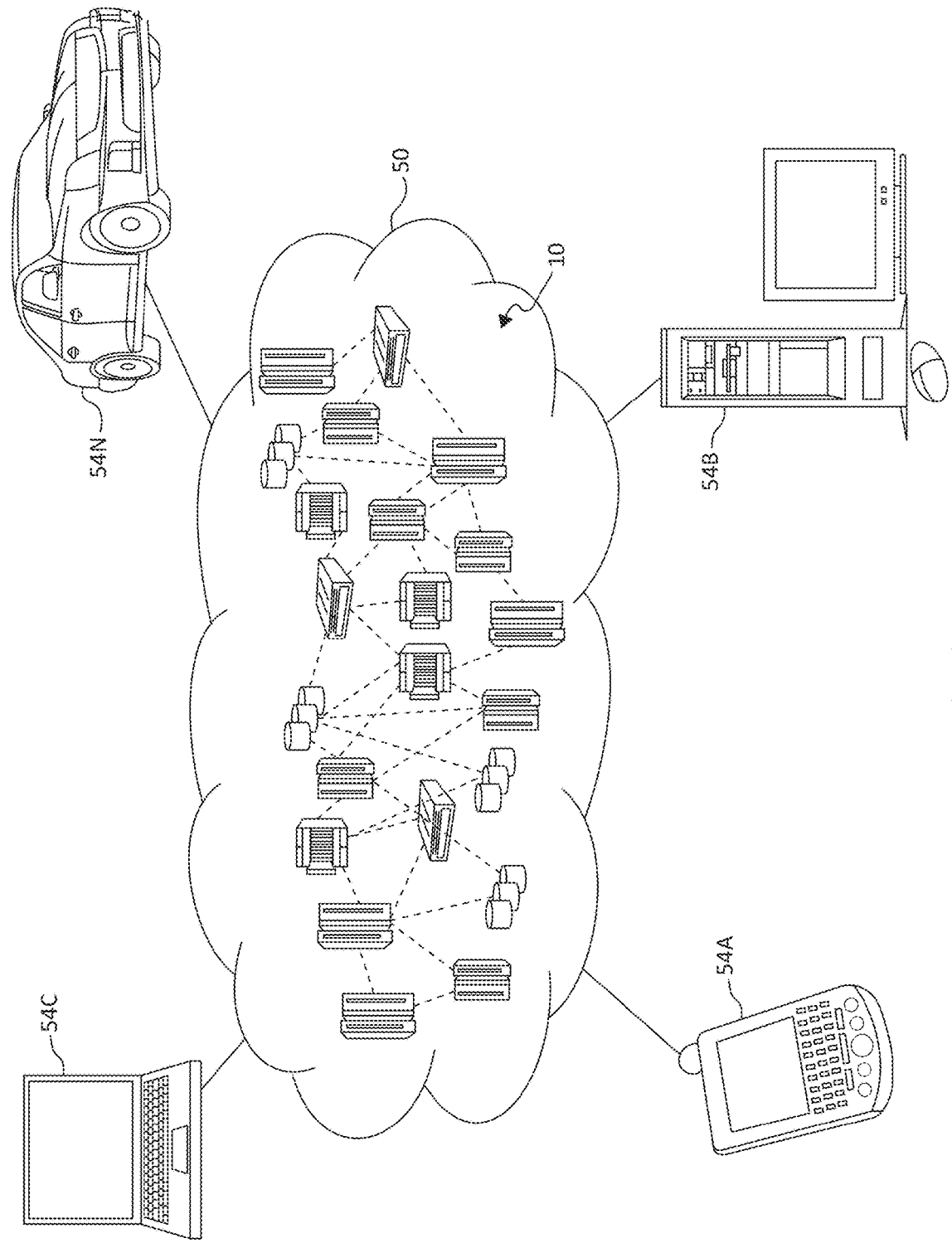
FIG. 2 is a block diagram depicting an exemplary cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
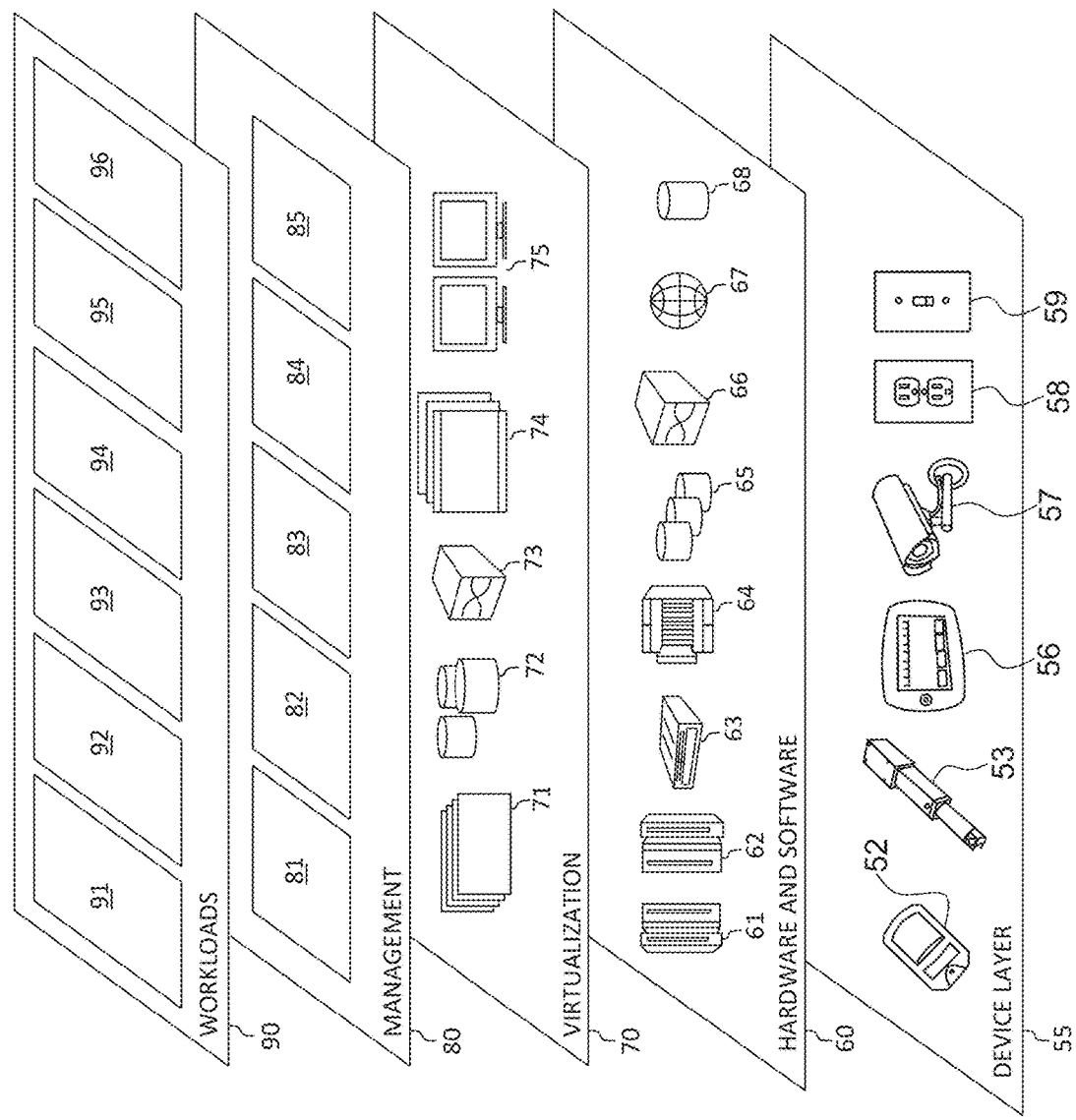
FIG. 3 is a block diagram depicting abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, within the context of the illustrated embodiments of the present invention, various workloads and functions 96 for performing compilation and optimization of computer programs, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

ECC STORAGE FOR MULIPLE COMPRESSED LINES STORED IN A CACHE LINE AT DIFFERING TIMES

Figure 4A:
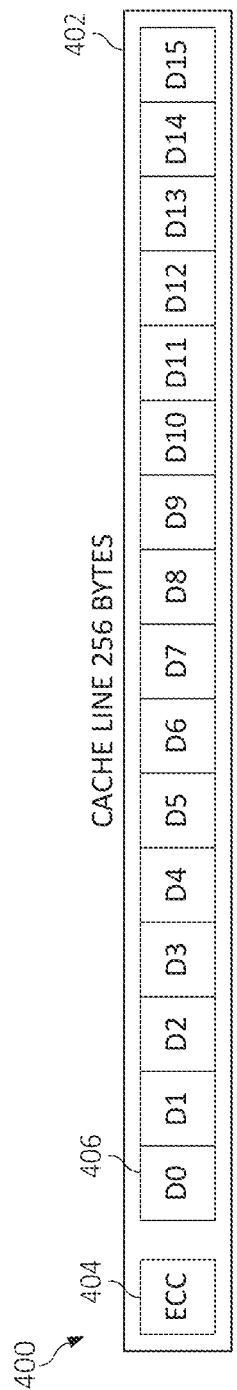
FIGS. 4A and 4B are block diagrams depicting a cache line, with a respective ECC, having two compressed items in 4B stored therein at differing times, according to an embodiment of the present invention.

With reference now to FIG. 4A, diagram 400 depicts a cache line 402 (e.g., a 256-byte cache line) having cached data 406 stored therein, and an ECC 404 (i.e., a single ECC word) for the cached data 406 stored in an ECC field of the cache line 402. As aforementioned, and as depicted in diagram 400, the ECC 404 is an XOR sum of all the constituents of the full cache line 402. This ECC, as known in the art, allows for construction via mathematical formulae of, in this instance, the cached data 406 when the data has become corrupt (e.g., a memory module holding the data fails). By way of background, diagram 400 illustrates that the XOR of an identity (e.g., "X") with zero yields back an output of X, the XOR of an identity (e.g., "Y") with itself yields back an output of zero, and the XOR of (X⊕Y) ⊕Y yields back an output of X.

Figure 4B:
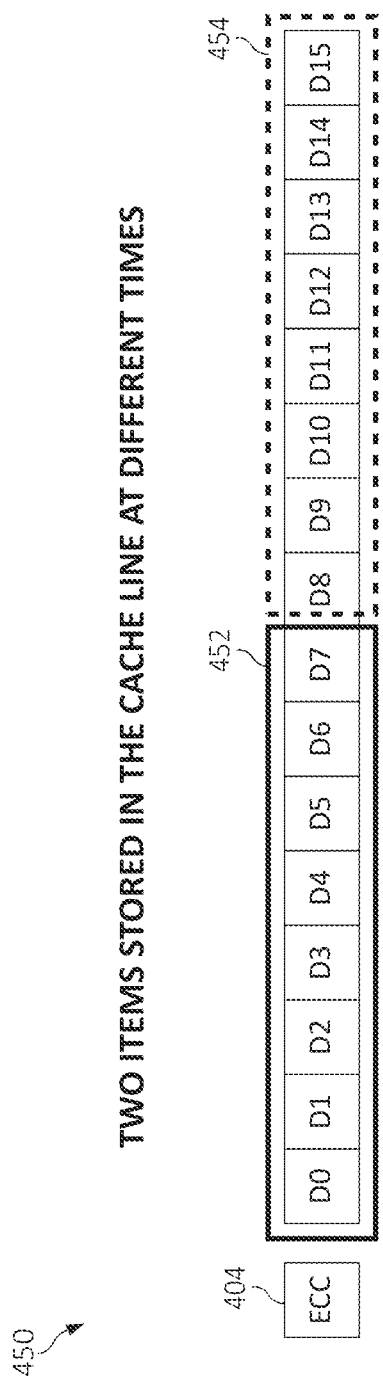

Referring now to FIG. 4B, diagram 450 depicts the cache line 402 having stored therein a first set of compressed data blocks (compressed data 452) stored into the cache line 402 at a first time, and a second set of compressed data blocks (compressed data 454) stored into the cache line 402 at a second time subsequent the first time. In other words, compressed data 452 was first stored in the cache line 402, and when stored the compressed data 452 did not fill the entire length of the cache line 402. An ECC 404 for the compressed data 452 is stored in the ECC field of the cache line 402 upon receipt of the compressed data 452. Compressed data 454 was then received into the cache line 402 at a time after the compressed data 452 was stored. As previously discussed, the complication with receiving compressed data 454 into the cache line 402 at the time after the compressed data 454 was received, is that to compute the ECC 404 for the cache line 402 having stored therein both compressed data 452 and compressed data 454, the entire cache line 402 must be read, a new ECC 404 must be computed that incorporates both compressed data 452 and compressed data 454, and all data must then be written back to the cache line 402 and the new ECC 404 be stored in the ECC field of the cache line 402. This read-modify-write operation is inefficient and consumes excessive bandwidth and input/output (I/O) resources, as simply storing the compressed data 454 into the cache line in a single operation has effectively become three operations to provide ECC protection to the line.

To process such an operation more efficiently, the present invention, in one embodiment, provides novel methods to allow the storage of multiple ECC words in the cache line 402. In this way, an ECC may be computed, for example, for only compressed data 452 when this data is received into the cache line 402 at the first time, and another ECC may be computed for only compressed data 454 when this data is received into the cache line 402 at the second, subsequent time. In one embodiment, the ECC for only the compressed data 452 is stored in the designated ECC field of the cache line 402 once the ECC is computed for the compressed data 452 as it is received. Then, when subsequent compressed data, such as compressed data 454, is received into the cache line 402, an additional ECC is computed for only the compressed data 454, and this ECC data is appended to the compressed data 454 itself. In other words, the additional ECC, computed only for the compressed data 454, is appended to the next-empty space (or any other empty space) within the cache line 402 available due to the compression of the stored data.

Figure 5:
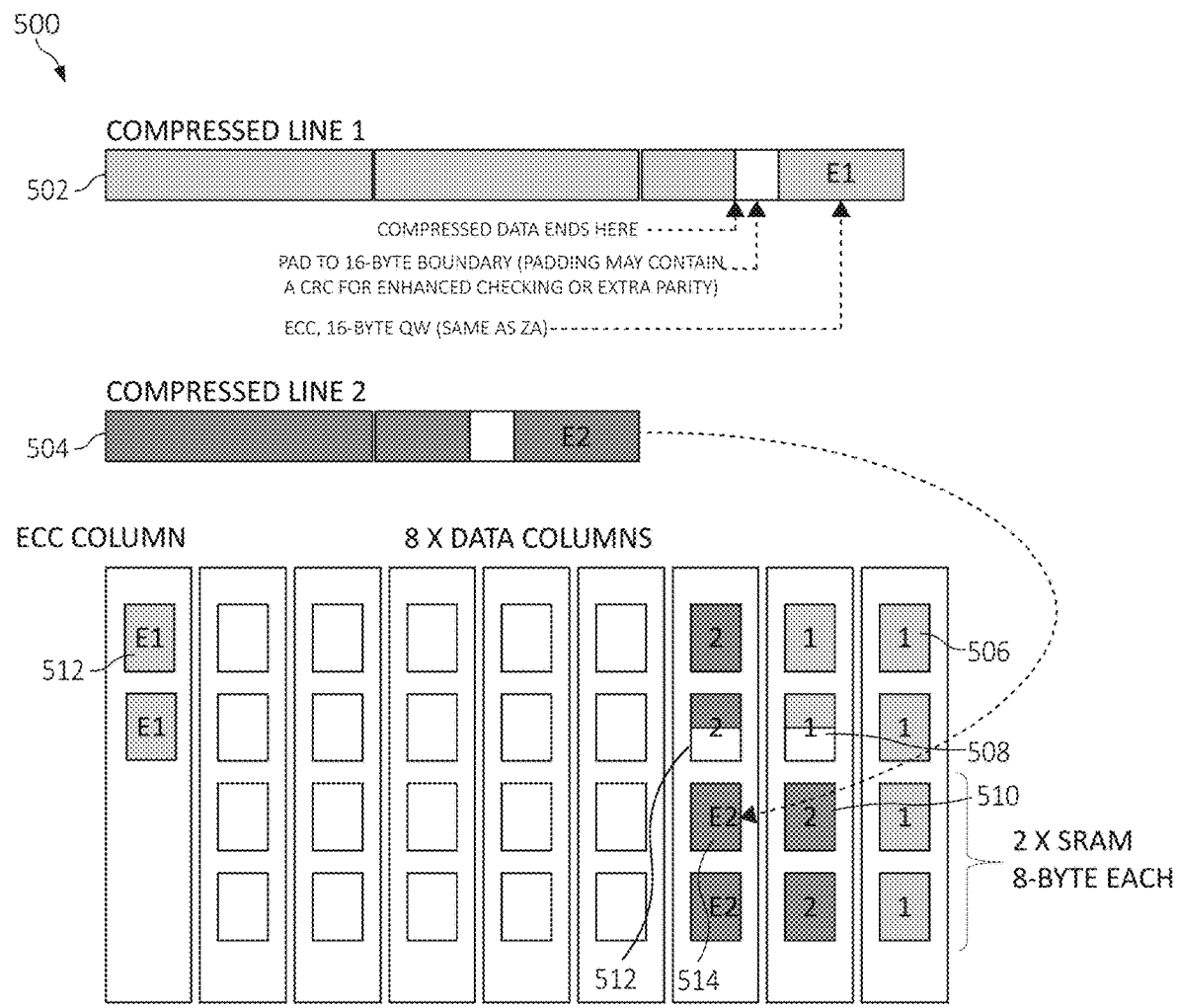
FIG. 5 is a block diagram depicting a cache data array having two compressed items stored in a respective cache line at differing times, where a respective ECC is computed for each compressed item, according to an embodiment of the present invention.

Turning now to FIG. 5, diagram 500 illustrates the aforementioned process in operation as performed, for example, by the computer system/server 12 described in FIG. 1. Diagram 500 depicts a first compressed line of data 502 and a second compressed line of data 504 in the cache 32. It should be noted that the cache 32 is depicted with eight data columns and one ECC column for each cache line consisting of the eight data columns, however this illustration is merely for brevity. As discussed prior, the cache line may consist of sixteen blocks (e.g., consisting of 16-bytes each) along with its respective ECC (e.g., consisting of 16-bytes), or any other configuration thereof.

In operation, when receiving the first compressed line 502 into the cache 32, the first compressed line 502 is written to the first empty space in a cache line, as in block 506. The first compressed line 502 is then padded with zero bits to an ECC-size boundary, as in block 508. In other words, because the first compressed line 502 (and all other compressed lines) are of variable length, once the compressed data of the first compressed line 502 is written to the first available space in the cache line, the first compressed line 502 is padded with zero bits until a 16-byte boundary remains in the line (i.e., the ECC-size boundary). The ECC of only the first compressed line 502, as modified with the padding, is then computed by XORing the ECC-size items of the (modified) first compressed line 502. This ECC of the (modified) first compressed line 502 is written to the ECC array in the cache 32, as in block 512. That is, the first compressed line 502, after having been modified with the padding of zero bits until the 16-byte ECC-size boundary, is stored in the first available cache line and the ECC for this modified first compressed line 502 is written in the traditional ECC field of the cache 32.

Next, at a subsequent point in time when the second compressed line 504 is received into the cache 32, the second compressed line 504 is written to the next empty space in the cache line (i.e., appended after the modified first compressed line 502 or any other empty space available), as in block 510. The second compressed line 504, similar to the first compressed line 502, is padded with zero bits to the 16-byte ECC-size boundary, as in block 512. Without reading the first compressed line 502, the ECC for only the (modified) second compressed line 504 is then computed by XORing the ECC-size items of the second compressed line 504, and this ECC for the (modified) second compressed line 504 is appended to the second compressed line 504 almost as if the ECC were part of the line's data, as in block 514.

Put simply, the ECC of (any) first compressed line received by the cache 32 is computed and stored in the traditional ECC field of the array. In some embodiments, a computed ECC for an uncompressed data line may additionally or alternatively be stored within the traditional ECC field of the array. With respect to (any) second (or subsequent) compressed line(s) received by the cache 32, the ECC-size boundary created by the padding of zero bits up to the boundary line enables the ECC of the any second or subsequent compressed line(s) to be appended therein obviating the need to perform a read-modify-write operation to compute a new ECC for the entire cache line (a first existing compressed line and a second compressed line received at some point after the first) and store the new ECC in the traditional ECC field in the array.

In some embodiments, a cyclic redundancy checksum (CRC) of (any) compressed line(s) received into the cache line of the cache 32 may be written in the padded space to increase the error detection capability of the line (or extra parity). Further, it should be noted that, as alluded to above, the performance of the steps associated with blocks 506-512 are equally applicable to a scenario where more than two compressed lines have been received by the cache 32 (at differing times). Following the same procedure, the ECC for any compressed line received into the cache 32 will be computed and written to the traditional ECC field of the array, and the ECC for any compressed line(s) received subsequent to the compressed line received first will be computed and appended to the compressed line itself. Further, in some embodiments, it should be noted that the ECC appended to the compressed line(s) received by the cache 32 may not necessarily need to be appended to the compressed line for which the ECC was computed. A compressed line length means, for example, may be provided outside the cache 32 such that each ECC position for a respective compressed line is known, when it becomes necessary to correct errors.

ECC COMPUTATION AND STORAGE FOR PARTIAL READS AND WRITES

In some embodiments, to mitigate the penalties associated with partial reads and writes to the cache 32 as discussed previously, methods of computation and placement of ECC in the cache 32 are disclosed which enable partial reads and writes to each line of data in the cache, inclusive of enabling access to a plurality of sectors in a single line. This may be facilitated by constructing an auxiliary ECC cache alongside the cache 32, where the auxiliary ECC cache may be constructed in a processor(s) (e.g., processors 16), I/O devices, and/or accelerators. The auxiliary ECC cache is, in principle, expected to be substantially smaller than the cache 32 at a size that enables the auxiliary ECC cache to only temporarily store partially computed ECC. By only partially computing ECC and temporarily storing such in the auxiliary ECC cache, this advantageously reduces the number of read/write operations otherwise required to be performed when ECC are present for cached data.

Explained as a logical operation, consider a cache line of a cache 32 consisting of data A, B, C, D, . . . and a respective ECC computed for the cache line. The ECC is therefore computed as: ECC:=A⊕B⊕C⊕D Suppose that an application requests only data D, modifies this data, and requests to perform a partial write to the cache line, for example to replace data D with modified data X. Of course, a partial write of data X could be performed to replace data D, however this would render the ECC for the cache line invalid because X was not a constituent when XORing data A, B, C, and D together as illustrated above. As described earlier, the prior art solution to computing a new ECC for X is to first read data A, B, and C, XOR this data with X, and write the new ECC into the ECC field of the cache line. This incurs the aforementioned read-modify-write penalty, however, because resources are utilized to read and write data A, B, and C from and to the cache 32, when this data was not requested by the application but rather only used to compute the ECC for the partially modified data X.

In some embodiments, therefore, when a data line is only partially read from the cache 32 (i.e., an application requests only data associated with a 64-byte sector), an ECC for only this sector is computed in real-time. This sector-ECC (SECC) is then XORed with the entire cache line ECC, resulting in a partial-ECC (PECC) for the cache line (PECC=ECC⊕SECC). The PECC along with an address tag of the sector are then stored in the auxiliary ECC cache.

At a subsequent time, when the processor (and/or I/O device and/or accelerator) modifies this read sector which needs to be written to the cache 32, a new sector ECC (e.g., SECC') may be formed. The sector's address, via its address tag, is searched in the auxiliary ECC cache where the tag was stored previously. If an address match is found in the auxiliary ECC cache, the updated cache line's ECC (e.g., ECC') is XORed as: ECC':=PECC⊕SECC'. The updated sector data and the updated ECC (ECC') are then written to the cache 32, which eliminates the need to perform a full read-modify-write of the entire cache line to determine the updated ECC based on the modified sector data. It should be noted that is no match is found in the auxiliary ECC cache for the address information, the previous (existing) entire cache line must be first read from the cache 32, the previous sector data must be overwritten with the modified sector data, the new ECC must be computed for the cache line, and the new cache line and new ECC must then be written to the cache 32, therefore incurring a read-modify-write penalty.

Figure 6A:
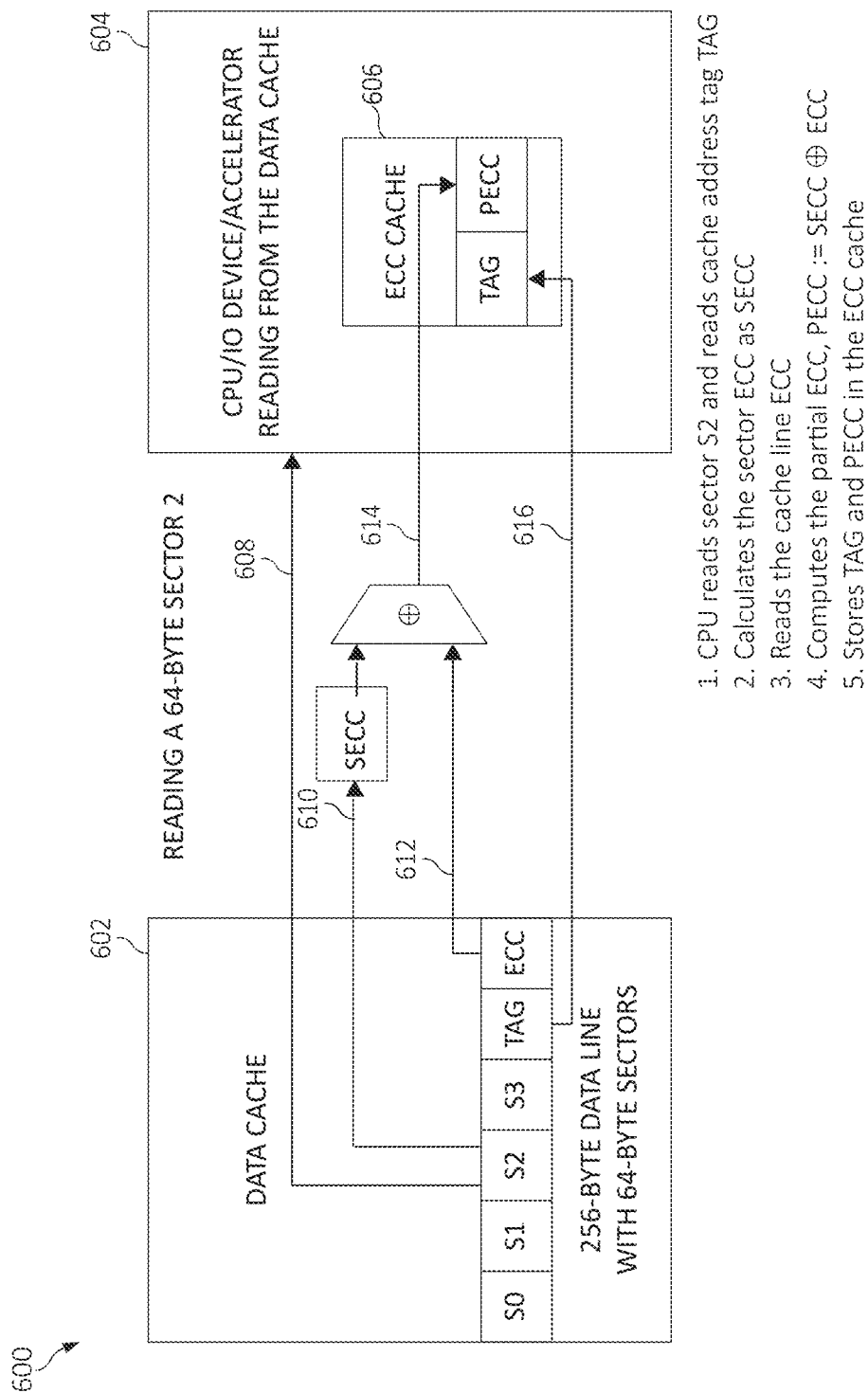
FIGS. 6A-6B are block diagrams depicting a data cache read and auxiliary ECC cache write, and a data cache write and auxiliary ECC cache read, respectively, according to an embodiment of the present invention.
Figure 6B:
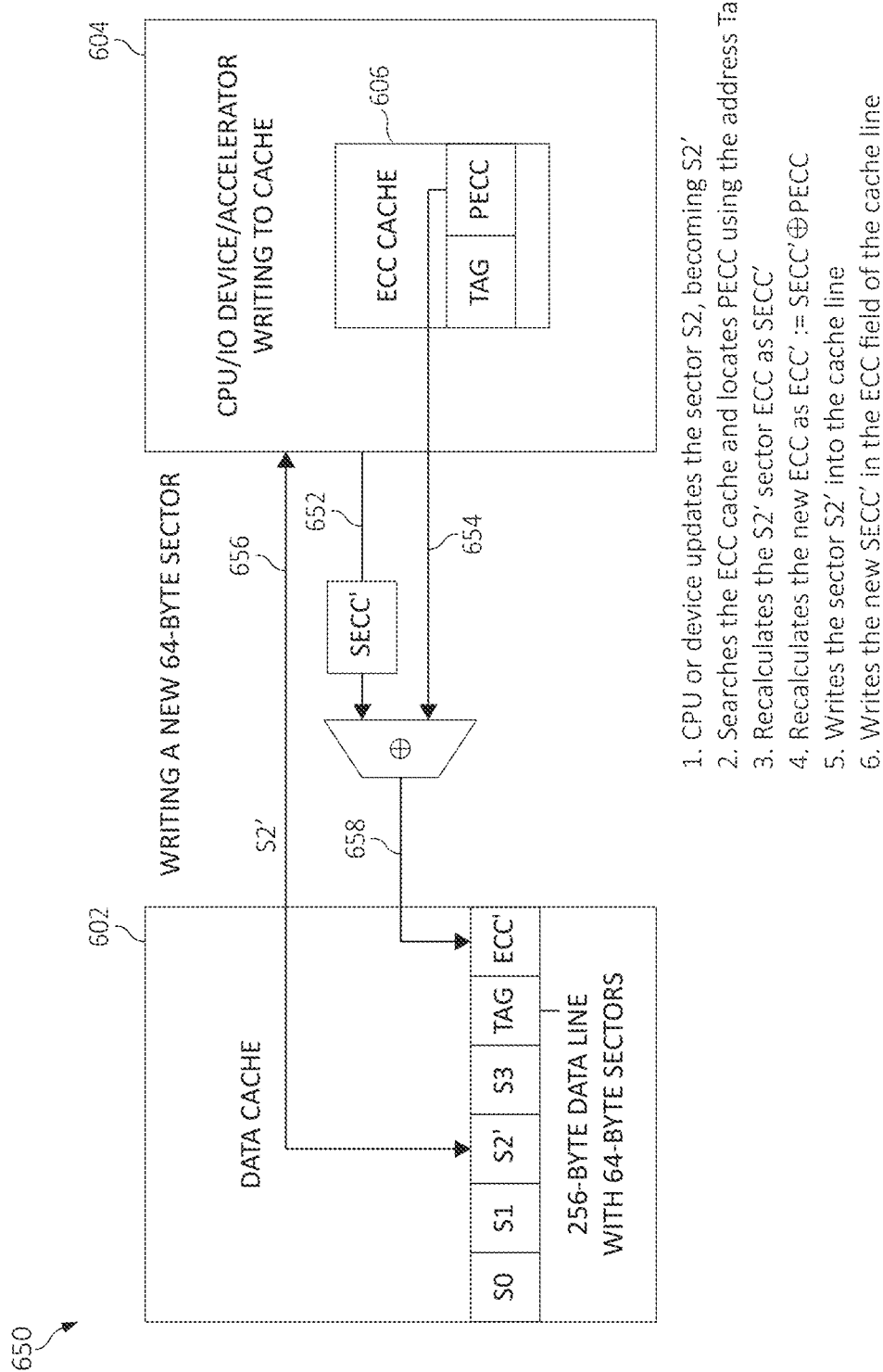

Turning to FIGS. 6A and 6B, diagram 600 of a data cache read and auxiliary ECC cache write, and diagram 650 of a data cache write and auxiliary ECC cache read are depicted to illustrate the aforementioned process. Referring now to diagram 600 of FIG. 6A, a cache 602 (e.g., cache memory 32) having a fixed-length cache line (e.g., an abbreviated 256-byte cache line as depicted) with fixed-size sectors (e.g., 64-byte sectors) is illustrated. In the abbreviated depiction, the cache line includes sectors S0, S1, S2, and S3, address tag information, and an ECC for the cache line. Diagram 600 additionally depicts a processor, I/O device, and/or accelerator (as illustrated in FIG. 1 and referred to as resource 604 in FIGS. 6A and 6B) holding an auxiliary ECC cache 606.

In operation to perform a partial read from the cache 602, assume that a program requests partial data from the cache line, namely data held in sector S2. Upon reading sector S2 as in 608, the resource 604 additionally reads the cache address tag information, as in block 616. An SECC is computed on the fly (i.e., in real-time) for sector S2, as in block 610. The existing ECC for the entire cache line is then read, as in block 612, and the existing ECC for the cache line is XORed with the SECC to compute the PECC (PECC=ECC⊕SECC) as in 614. The PECC is then stored in the auxiliary ECC cache 606, along with the address tag information of sector S2, as in block 616.

Referring now to diagram 650 of FIG. 6B, in operation to perform a partial write to the cache 602, subsequent to the application modifying the data associated with sector S2, the updated data as modified becomes sector S2' as in 656. Prior to writing sector S2' to the cache, the resource 604 searches the auxiliary ECC cache 606 to locate the PECC using the address tag information. A new sector S2' ECC is then computed as SECC', as in block 652. In block 654, a new ECC for the cache line (having incorporated the modified sector S2') is computed by XORing the SECC' with the PECC. Data associated with sector S2' is then written to the cache line, as in block 656, and the new ECC' for the cache line is written to the ECC field of the cache line, as in block 658.

Again, it should be noted that if no match is found in the auxiliary ECC cache for the address information for S2 via the address tag, the previous (existing) entire cache line (of sectors S0, S1, S2, S3, etc.) must be first read from the cache 32, the previous sector data (S2) must be overwritten with the modified sector data (S2'), the new ECC (ECC') must be computed for the cache line, and the new cache line and new ECC' must then be written to the cache 602, therefore incurring a read-modify-write penalty.

Figure 7:
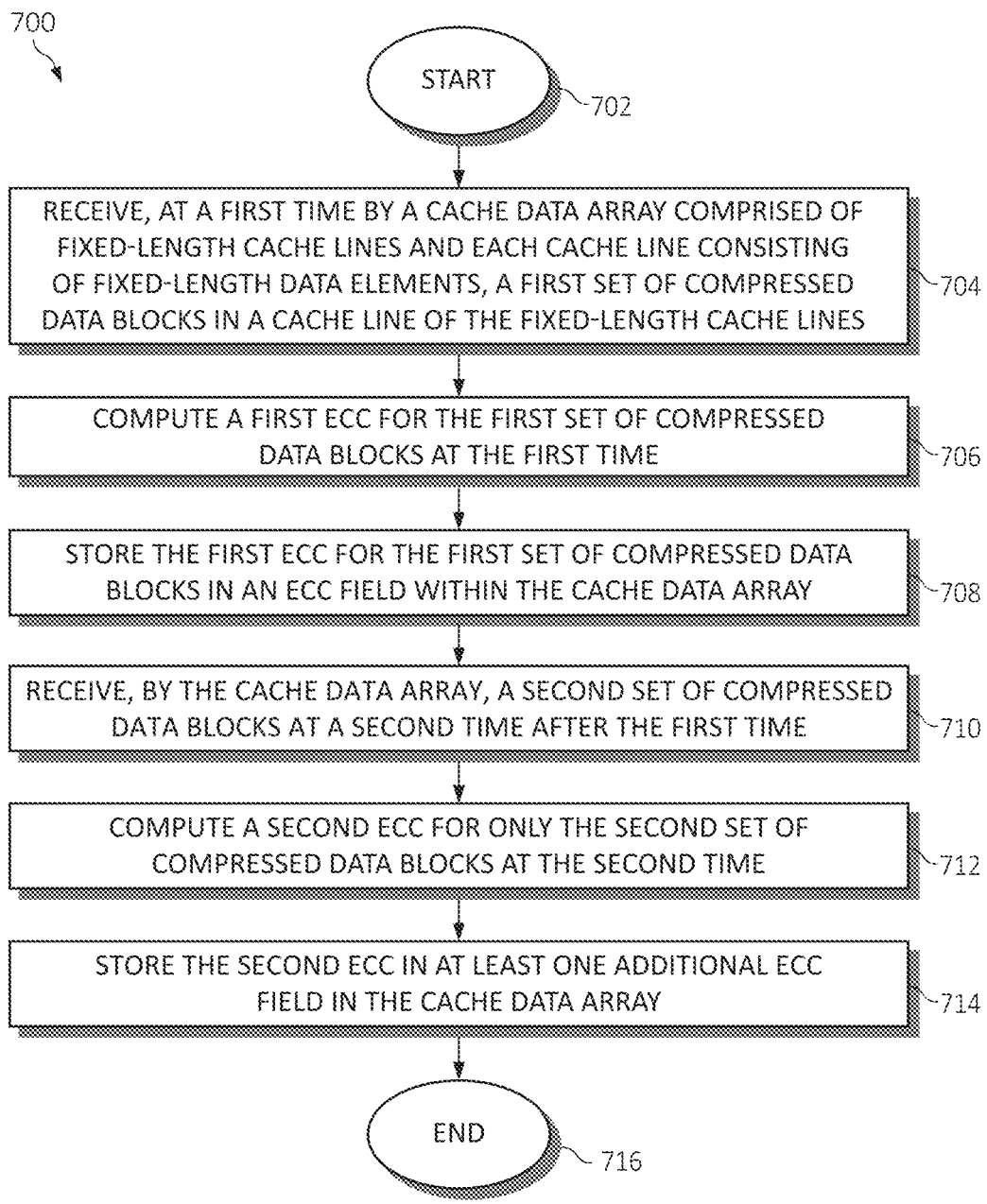
FIG. 7 is a flowchart diagram of an exemplary computer-implemented method for providing ECC for multiple data blocks in a cache line, according to an embodiment of the present invention.

Turning to FIG. 7, a flowchart diagram of an exemplary method 700 for providing multiple error correcting codes (ECC) for compressed data in a cache line is provided. The method 700 may be performed by, for example, the computer system/server 12 described in FIG. 1. The method 700 begins (step 702) by receiving, at a first time by a cache data array comprised of fixed-length cache lines and each cache line consisting of fixed-length data elements, a first set of compressed data blocks in a cache line of the fixed-length cache lines (step 704). A first ECC is computed for the first set of compressed data blocks at the first time (step 706), and stored in an ECC field within the cache data array (step 708). At a second time subsequent to the first time, a second set of compressed data blocks is received by the cache data array (step 710). A second ECC is computed for only the second set of compressed data blocks at the second time (step 712), and the second ECC is stored in at least one additional ECC field in the cache data array (step 714). The method 700 ends (step 716).

Figure 8:
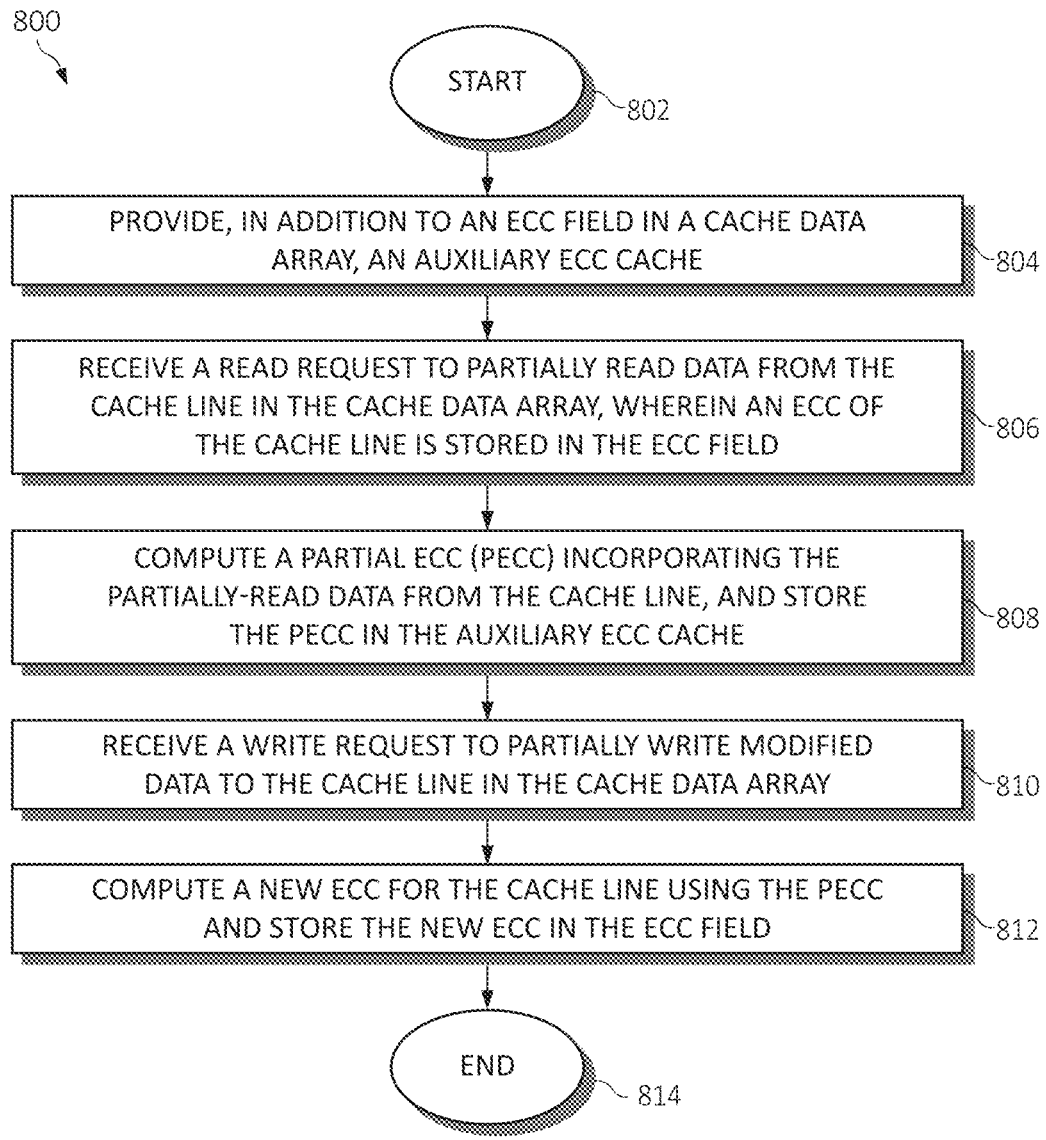
FIG. 8 is a flowchart diagram of an exemplary computer-implemented method for computing and storing ECC of partial reads and writes to a cache line, according to an embodiment of the present invention.

Turning to FIG. 8, a flowchart diagram of an exemplary method 800 for computing and storing error correcting codes (ECC) of partial reads and writes to a cache line is provided. The method 800 may be performed by, for example, the computer system/server 12 described in FIG. 1. The method 800 begins (step 802) by providing, in addition to an ECC field in a cache data array, an auxiliary ECC cache (step 804). A read request to partially read data from the cache line in the cache data array is received, where an ECC of the cache line is stored in the ECC field (step 806). A partial ECC (PECC) incorporating the partially-read data from the cache line is computed, and the PECC is stored in the auxiliary ECC cache (step 808). A write request to partially write modified data to the cache line in the cache data array is received (step 810), and a new ECC for the cache line is computed using the PECC. The new ECC is then stored in the ECC field (step 812). The method 800 ends (step 814).

In conjunction with the methods 700 and 800, storing the second ECC in the at least one additional ECC field may comprise appending the second ECC to the second set of compressed data blocks in the cache line.

In conjunction with the methods 700 and 800, the computation of at least one of the first ECC and the second ECC may be performed using an exclusive-OR (XOR) function.

In conjunction with the methods 700 and 800, an area of the first set of compressed data blocks and the second set of compressed data blocks may be padded with zero bits to an ECC-size boundary to uniformly position the first ECC and the second ECC within the first and second set of compressed data blocks.

In conjunction with the methods 700 and 800, a cyclic redundancy checksum (CRC) may be written in the padded area of the first set of compressed data blocks and the second set of compressed data blocks.

In conjunction with the methods 700 and 800, an address tag may be stored with the PECC in the auxiliary ECC cache.

In conjunction with the methods 700 and 800, computing the PECC may include computing a sector ECC (SECC) of the partially-read data; performing an exclusive-OR (XOR) function on the SECC and the ECC of the cache line, wherein an output of the XOR function comprises the PECC; and storing the address tag with the PECC in the auxiliary ECC cache.

In conjunction with the methods 700 and 800, computing the new ECC may include searching the auxiliary ECC cache to locate the PECC using the address tag; recalculating a new SECC for the partially-written modified data; and computing the new ECC for the cache line by performing the XOR function on the new SECC and the PECC, wherein the new ECC is stored in the ECC field of the cache data array.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A computer-implemented method for providing multiple error correcting codes (ECC) for compressed data in a cache line, the computer-implemented method, comprising:
   receiving, at a first time by a cache data array comprised of fixed-length cache lines and each cache line consisting of fixed-length data elements, a first set of compressed data blocks in a cache line of the fixed-length cache lines;
   computing a first ECC for the first set of compressed data blocks at the first time;
   storing the first ECC for the first set of compressed data blocks in an ECC field dedicated to storing ECCs of the cache line within the cache data array;
   receiving, by the cache data array, a second set of compressed data blocks at a second time subsequent to the first time;

computing a second ECC for only the second set of compressed data blocks at the second time;

storing the second set of compressed data blocks adjacent to the first set of compressed data blocks within the cache line; and storing the second ECC in at least one additional ECC field in a memory location separate than the ECC field storing the first ECC in the cache data array.

2. The computer-implemented method of claim 1, wherein storing the second ECC in the at least one additional ECC field comprises appending the second ECC to the second set of compressed data blocks in the cache line.

3. The computer-implemented method of claim 1, further comprising performing the computation of at least one of the first ECC and the second ECC using an exclusive-OR (XOR) function.

4. The computer-implemented method of claim 1, further comprising padding an area of the first set of compressed data blocks and the second set of compressed data blocks with zeros to an ECC-size boundary to uniformly position the first ECC and the second ECC within the first and second set of compressed data blocks.

5. The computer-implemented method of claim 4, further comprising writing a cyclic redundancy checksum (CRC) in the padded area of the first set of compressed data blocks and the second set of compressed data blocks.

6. A system for providing multiple error correcting codes (ECC) for compressed data in a cache line, the system comprising:
a hardware memory; and
a hardware processor executing instructions stored in the hardware memory; wherein, when executed, the instructions cause the hardware processor to:
receive, at a first time by a cache data array comprised of fixed-length cache lines and each cache line consisting of fixed-length data elements, a first set of compressed data blocks in a cache line of the fixed-length cache lines;
compute a first ECC for the first set of compressed data blocks at the first time;
store the first ECC for the first set of compressed data blocks in an ECC field dedicated to storing ECCs of the cache line within the cache data array;
receive, by the cache data array, a second set of compressed data blocks at a second time subsequent to the first time;
compute a second ECC for only the second set of compressed data blocks at the second time;
store the second set of compressed data blocks adjacent to the first set of compressed data blocks within the cache line; and
store the second ECC in at least one additional ECC field in a memory location separate than the ECC field storing the first ECC in the cache data array.

7. The system of claim 6, wherein storing the second ECC in the at least one additional ECC field comprises appending the second ECC to the second set of compressed data blocks in the cache line.

8. The system of claim 6, wherein, when executed, the instructions further cause the hardware processor to perform the computation of at least one of the first ECC and the second ECC using an exclusive-OR (XOR) function.

9. The system of claim 6, wherein, when executed, the instructions further cause the hardware processor to pad an area of the first set of compressed data blocks and the second set of compressed data blocks with zeros to an ECC-size boundary to uniformly position the first ECC and the second ECC within the first and second set of compressed data blocks.

10. The system of claim 9, wherein, when executed, the instructions further cause the hardware processor to write a cyclic redundancy checksum (CRC) in the padded area of the first set of compressed data blocks and the second set of compressed data blocks.

11. A computer program product for providing multiple error correcting codes (ECC) for compressed data in a cache line, the computer program product comprising a non-transitory computer-readable storage medium having program instructions embodied thereon, the program instructions executable by a processor to cause the processor to:
receive, at a first time by a cache data array comprised of fixed-length cache lines and each cache line consisting of fixed-length data elements, a first set of compressed data blocks in a cache line of the fixed-length cache lines;
compute a first ECC for the first set of compressed data blocks at the first time;
store the first ECC for the first set of compressed data blocks in an ECC field dedicated to storing ECCs of the cache line within the cache data array;
receive, by the cache data array, a second set of compressed data blocks at a second time subsequent to the first time;
compute a second ECC for only the second set of compressed data blocks at the second time;
store the second set of compressed data blocks adjacent to the first set of compressed data blocks within the cache line; and
store the second ECC in at least one additional ECC field in a memory location separate than the ECC field storing the first ECC in the cache data array.

12. The computer program product of claim 11, wherein storing the second ECC in the at least one additional ECC field comprises appending the second ECC to the second set of compressed data blocks in the cache line.

13. The computer program product of claim 11, wherein the program instructions executable by the processor further cause the processor to perform the computation of at least one of the first ECC and the second ECC using an exclusive-OR (XOR) function.

14. The computer program product of claim 11, wherein the program instructions executable by the processor further cause the processor to pad an area of the first set of compressed data blocks and the second set of compressed data blocks with zero bits to an ECC-size boundary to uniformly position the first ECC and the second ECC within the first and second set of compressed data blocks.

15. The computer program product of claim 11, wherein the program instructions executable by the processor further cause the processor to write a cyclic redundancy checksum (CRC) in the padded area of the first set of compressed data blocks and the second set of compressed data blocks.

* * * * *